United States Patent [19]

Koeniger

[11] Patent Number: 5,464,107
[45] Date of Patent: Nov. 7, 1995

[54] HOLLOW PLASTIC CONTAINER WITH VIEWING STRIPE AND METHOD OF MAKING

[75] Inventor: Carl E. Koeniger, Toledo, Ohio

[73] Assignee: Owens-Illinois Plastic Products Inc., Toledo, Ohio

[21] Appl. No.: 83,127

[22] Filed: Jun. 25, 1993

[51] Int. Cl.[6] .......................... B65D 23/00; B29C 47/06
[52] U.S. Cl. .................. 215/12.2; 220/662; 264/514; 425/532; 428/203
[58] Field of Search ................... 215/1 C, 12.2, 215/12.1; 220/453, 455, 662, 663; 425/532; 428/203; 264/512, 514, 515

[56] References Cited

U.S. PATENT DOCUMENTS

| | | |
|---|---|---|
| 1,203,448 | 10/1916 | Ainsworth . |
| 2,227,682 | 1/1941 | Wade . |
| 4,079,850 | 3/1978 | Suzuki . |
| 4,105,732 | 8/1978 | Slingluff . |
| 4,289,817 | 9/1981 | Valyi ................................ 428/203 X |
| 4,507,071 | 3/1985 | Hahn . |
| 4,626,455 | 12/1986 | Karabedian ..................... 215/12.2 X |
| 4,798,751 | 1/1989 | Schuetz . |
| 4,802,833 | 2/1989 | Shapler .............................. 425/532 |
| 4,832,211 | 5/1989 | Matthews et al. .................. 215/1 C |
| 4,832,965 | 5/1989 | Helin . |
| 4,890,994 | 1/1990 | Shapler et al. .................. 215/1 C X |
| 4,990,382 | 2/1991 | Weissenstein et al. ........ 215/122 X |
| 5,204,120 | 4/1993 | Hirshichberger .................... 425/132 |
| 5,221,540 | 6/1993 | Hirschberger ................. 425/532 X |

*Primary Examiner*—Allan N. Shoap
*Assistant Examiner*—Christopher J. McDonald

[57] ABSTRACT

A hollow plastic container including a coextruded translucent plastic outer layer, an opaque plastic inner layer, and a viewing stripe of translucent or clear plastic material extending longitudinally in the inner layer. In one form the container viewing stripe is in the inner layer made of clear plastic material placed behind a thin translucent layer. In another form, the stripe is made of the same translucent plastic material as the outer layer. In a further form an additional inner layer is provided of translucent or clear plastic material. The hollow plastic container is made by coextruding a parison of at least two plastic layers to form an outer translucent plastic layer and an inner opaque plastic layer, and simultaneously coextruding a viewing stripe in the inner layer and extending longitudinally of the parison. This method allows production of a distinct viewing stripe of the same nominal outside color of an otherwide opaque plastic container.

17 Claims, 2 Drawing Sheets

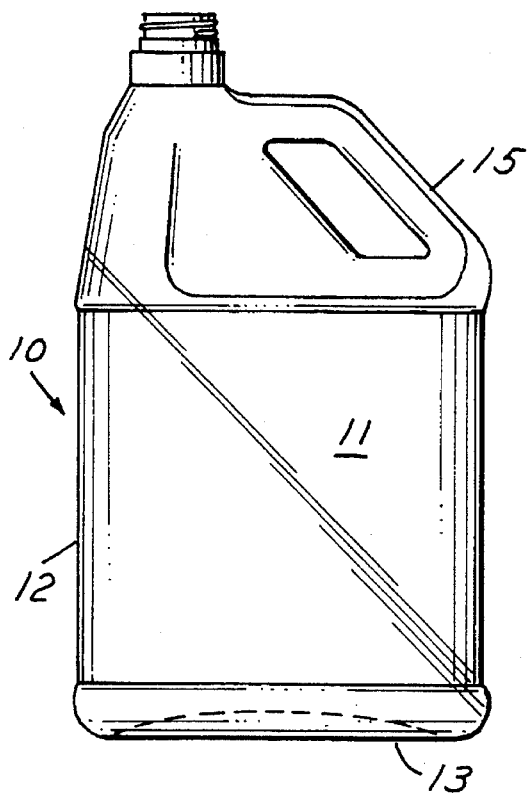
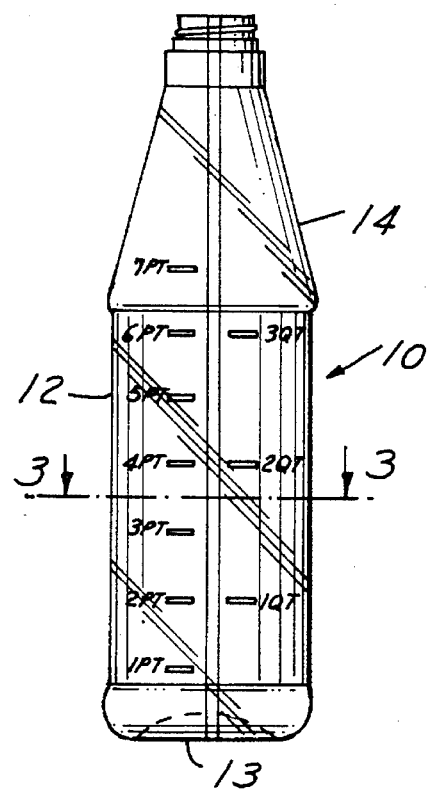
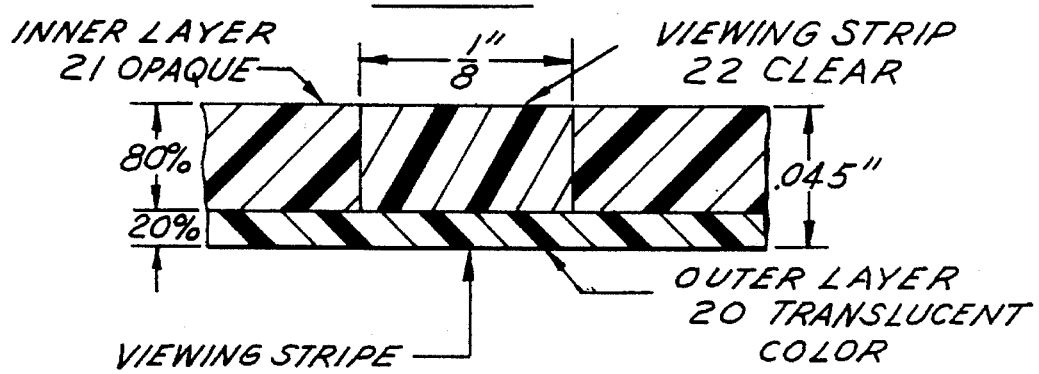
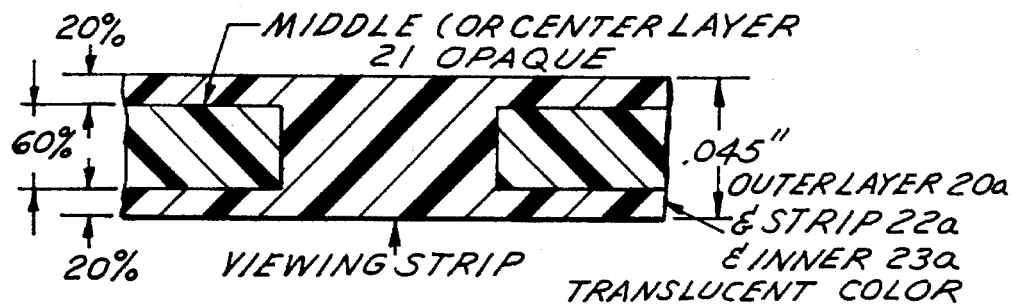

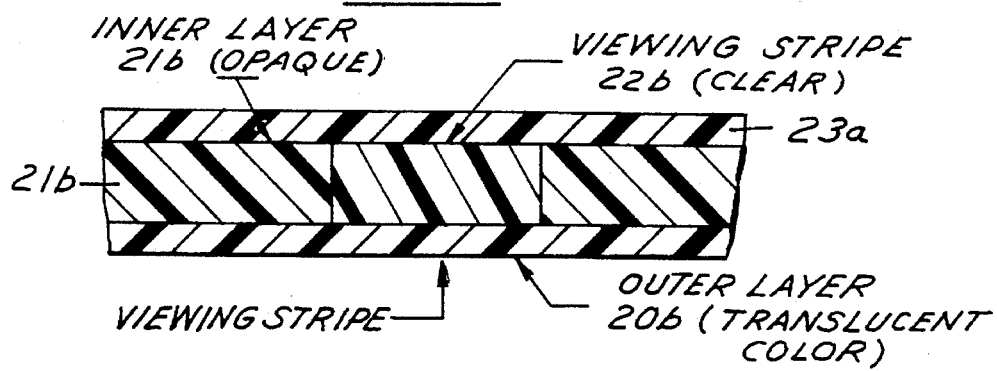
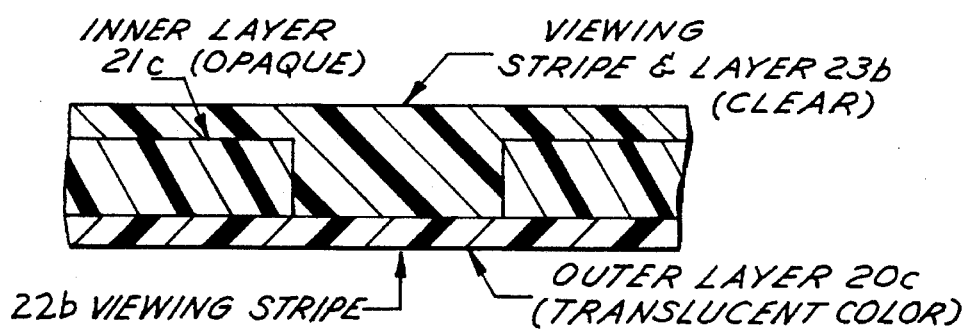
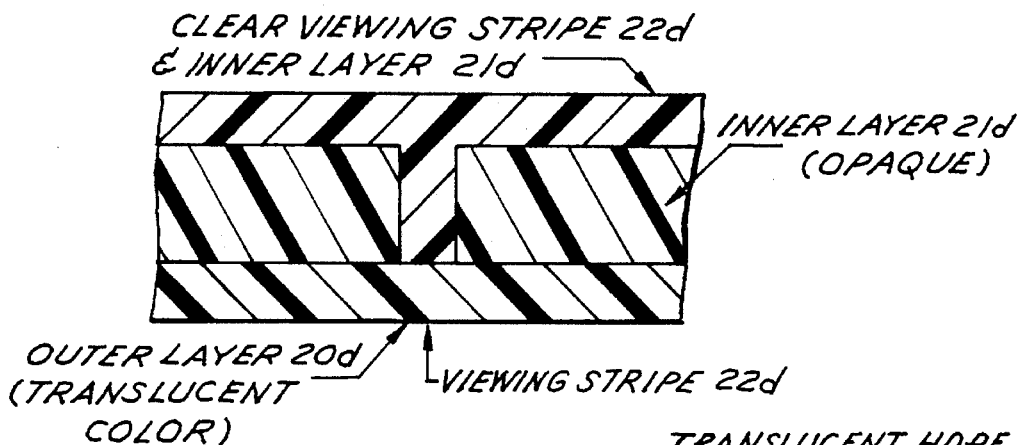
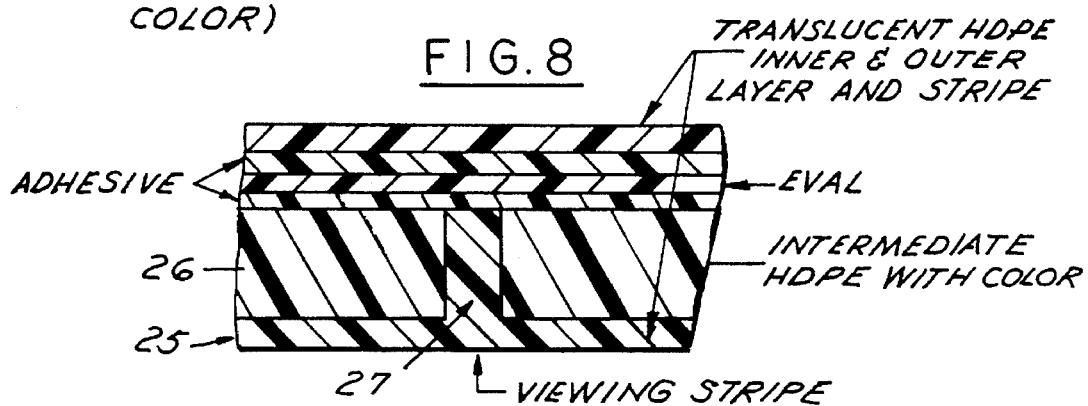

HOLLOW PLASTIC CONTAINER WITH VIEWING STRIPE AND METHOD OF MAKING

This invention relates to hollow plastic containers having a viewing stripe and to a method for making such containers.

BACKGROUND AND SUMMARY OF THE INVENTION

It has been common to make hollow plastic containers of a single layer of plastic by simultaneously extruding a viewing stripe along one side of the container for viewing the level of contents in the container. Thus, the viewing stripe is made of clear material. However, this adversely affects the aesthetics of the container.

Among the objectives of the present invention are to provide a hollow plastic container and method of making the container wherein the aesthetics of the bottle are not adversely affected but the product inside the container is visible through the stripe; and to provide such a construction without the need for an additional extruder.

In accordance with the invention a hollow plastic container includes a coextruded translucent plastic outer layer, an opaque plastic inner layer, and a viewing stripe of translucent or clear plastic material extending longitudinally in the inner layer. In one form the container viewing stripe is made of clear plastic material. In another form, the stride is made of the same translucent plastic material as the outer layer. In a further form an additional inner layer is provided of translucent or clear plastic material. The hollow plastic container is made by coextruding a parison of at least two plastic layers to form an outer translucent plastic layer and an inner opaque plastic layer, and simultaneously coextruding a viewing stride in the inner layer and extending longitudinally of the parison.

DESCRIPTION OF THE DRAWINGS

FIG. 1 is a front elevational view of a hollow plastic container embodying the invention.

FIG. 2 is a side elevational view of the container.

FIG. 3 is a horizontal partly diagrammatic sectional view of a side wall of the container taken along the line 3—3 in FIG. 2.

FIG. 4 is a horizontal partly diagrammatic sectional view of a modified form of the container.

FIG. 5 is a horizontal partly diagrammatic sectional view of a further modified form of the container.

FIG. 6 is a horizontal partly diagrammatic sectional view of a still further modified form of the invention.

FIG. 7 is a sectional partly diagrammatic view of another modified form of the invention.

FIG. 8 is a sectional partly diagrammatic view of still another modified form of the invention.

DESCRIPTION

Referring to FIGS. 1 and 2, a hollow plastic container 10 embodying the invention comprises a side wall 11, an end wall 12, a base wall 13 and an integral neck 14. The container may also have an integral handle 15. The container 10 is made from a coextruded tubular parison and blown in a suitable mold by well known apparatus such as extrusion blow molding apparatus which is coextruded.

As shown in FIG. 3, which is a horizontal cross section of a portion of the wall of container 10, on a greatly enlarged scale cross section, the end wall 12 includes an outer translucent layer 20 having a color pigment therein such as that is made translucent and an inner layer 21 which is opaque with the exception of a coextruded clear vertical plastic viewing stripe 22. By such an arrangement, the level of the contents in the container can be viewed through the clear plastic stripe 22 which is positioned behind the outer translucent layer 20.

In a typical example, the outer translucent layer 20 may comprise high density polyethylene (HDPE) with organic colorant; the inner opaque layer 21 may comprise high density polyethylene (HDPE) with $TiO_2$; and the viewing stripe 22 may comprise natural high density polyethylene (HDPE).

As shown, for example, the thickness of the outer layer 20 comprises 20% of the total thickness of 0.045" and the inner layer 21 comprises 80% of the total thickness.

In the form shown in FIG. 4, an additional inner layer 23 of translucent plastic is provided and the outer layer 20a, additional layer 23 and viewing stripe 22a are made of the same material.

In a typical example, the outer layer, 20a, viewing stripe 22a and an additional layer comprise high density polyethylene (HDPE) with organic or other translucent colorant and the inner layer 21a comprises high density polyethylene (HDPE) with $TiO_2$.

As shown, for example, the outer layer comprises 20% of the thickness of 0.045", the middle layer 21a comprises 60% of the thickness and the additional inner layer 23 comprises 20% of the thickness.

In the form shown in FIG. 5 an additional inner layer 23a is provided. The outer layer 20b is made of translucent plastic material with color, the middle layer 21b is made of opaque plastic, the viewing stripe 22b is made of clear plastic material and the additional layer 23a is made of translucent plastic.

In a typical example, the outer layer 20b is made of high density polyethylene (HDPE) with organic or other translucent colorant; the middle layer 21b is made of high density polyethylene (HDPE) with $TiO_2$; the additional layer 23a is made of the same material as the outer layer.

In the form shown in FIG. 6 the additional layer 23b and the viewing stride 22b are made of the same clear plastic material.

The form shown in FIG. 7 is like that shown in FIG. 6, except that the viewing stripe is more narrow. Corresponding layers are identified with the suffix d.

In the form shown in FIG. 8 the wall comprises coextruded layers comprising an outer translucent layer 25; and intermediate opaque layer 26 with color containing a viewing stripe 27.

The forms shown in FIGS. 3, 5, 6 and 7, requires three extruders; the form shown in FIG. 4, requires two extruders; the form shown in FIG. 8, requires four extruders.

The container 10 may have indicia such as molded horizontal lines and associated numerical designations adjacent the viewer stripe.

It can thus be seen that there has been provided a hollow plastic container and method of making the container wherein the aesthetics of the bottle are not adversely affected but the product inside the container is visible through the stripe; and to provide such a construction without the need for an additional extruder.

I claim:

1. A hollow plastic container comprising a coextruded translucent plastic outer layer and an opaque coextruded plastic inner layer, and a coextruded viewing stripe of translucent plastic material behind said translucent outer layer extending longitudinally in said inner layer for viewing the level of the product in the container, said coextruded stripe being made of the same translucent plastic material as said outer layer, and an additional coextruded inner layer of the same translucent plastic material.

2. The hollow plastic container set forth in claim 1 including an additional inner layer of translucent plastic.

3. The hollow plastic container set forth in claim 2 wherein said outer layer and said additional inner are made of high density polyethylene with translucent colorant, and said inner layer is made of high density polyethylene with TiO$_2$.

4. The method of forming a hollow plastic container comprising coextruding a parison of at least two plastic layers to form an outer translucent plastic layer and an inner opaque plastic layer, simultaneously coextruding a viewing stripe of translucent material in said inner layer extending longitudinally of the parison, said step of coextruding said stripe being by the use of translucent plastic material as the outer layer, and simultaneously coextruding an additional translucent inner layer on the inner layer.

5. The method of forming a hollow plastic container comprising coextruding a parison of at least two plastic layers to form an outer translucent plastic layer and an inner opaque plastic layer, and simultaneously coextruding a viewing stripe of clear material in said inner layer extending longitudinally of the parison, said step of coextruding said coextruded stripe comprising using clear plastic material, and simultaneously coextruding an additional clear inner layer on the inner layer.

6. The method set forth in any one of claims 4 and 5 including the step of blow molding said parison to form a container having a longitudinally extending viewing stripe.

7. A hollow plastic container comprising a coextruded translucent plastic outer layer and an opaque coextruded plastic inner layer, and a coextruded viewing strip of translucent plastic material behind said translucent outer layer extending longitudinally in said inner layer for viewing the level of the product in the container, said viewing stripe being made of the same translucent material as said outer layer, and an additional coextruded of the same inner layer of the same translucent plastic material.

8. The hollow container set forth in claim 7 wherein said outer layer, viewing stripe and additional layer comprise the same plastic material.

9. The hollow container set forth in claim 8 wherein said outer layer, viewing stripe and additional layer comprise high density polyethylene with translucent colorant.

10. The method of forming a hollow plastic container comprising coextruding a parison of at least two plastic layers to form an outer translucent plastic layer and an inner opaque plastic layer, and simultaneously coextruding a viewing stripe of translucent material in said inner layer extending longitudinally of the parison, said coextruded stripe being made of the same translucent plastic material as the outer layer, and coextruding an additional translucent inner layer on the inner layer.

11. The method of forming a hollow plastic container comprising coextruding a parison of at least two plastic layers to form an outer translucent plastic layer and an inner opaque plastic layer, and simultaneously coextruding a viewing stripe of translucent material in said inner layer extending longitudinally of the parison, said coextruded stripe being made of clear plastic material, and coextruding an additional translucent inner layer on the inner layer.

12. The hollow plastic container comprising a coextruded translucent plastic outer layer and an opaque coextruded plastic inner layer, and a coextruded viewing stripe of translucent plastic material behind said translucent outer layer extending longitudinally in said inner layer for viewing the level of the product in the container, said outer translucent layer comprises high density polyethylene with translucent colorant.

13. The hollow plastic container set forth in claim 12 wherein said inner opaque layer comprises high density polyethylene with TiO$_2$.

14. The hollow plastic container set forth in claim 13 wherein said viewing stripe comprises natural high density polyethylene.

15. The hollow plastic container set forth in any one of claims 1, 13–14 wherein said inner layer comprises the major portion of the thickness of said container.

16. The hollow plastic container set forth in claim 15 wherein said additional layer and viewing stripe are made of the same clear plastic material.

17. The hollow plastic container set forth in claim 16 including coextruded adhesive and EVAL layers interposed between said additional inner layer and said inner layer.

* * * * *